United States Patent
Benson et al.

(10) Patent No.: US 6,819,780 B2
(45) Date of Patent: Nov. 16, 2004

(54) METHOD AND APPARATUS FOR AUTOMATICALLY STEERING A VEHICLE IN AN AGRICULTURAL FIELD USING A PLURALITY OF FUZZY LOGIC MEMBERSHIP FUNCTIONS

(75) Inventors: Eric Benson, Urbana, IL (US); Qin Zhang, Champaign, IL (US); John F. Reid, Champaign, IL (US)

(73) Assignee: CNH America LLC, Racine, WI (US)

( * ) Notice: Subject to any disclaimer, the term of this patent is extended or adjusted under 35 U.S.C. 154(b) by 562 days.

(21) Appl. No.: 09/776,090

(22) Filed: Feb. 2, 2001

(65) Prior Publication Data

US 2002/0106108 A1 Aug. 8, 2002

(51) Int. Cl.⁷ .................................................. G06K 9/00
(52) U.S. Cl. ...................... 382/104; 701/49; 340/907; 180/8.3; 382/287
(58) Field of Search ................................ 382/104, 103, 382/108, 181, 180, 189, 106, 107, 151, 183, 206, 316, 321, 287; 701/50, 49; 340/946, 907; 180/8.3; 702/150; 56/10.2; 111/200; 348/113

(56) References Cited

U.S. PATENT DOCUMENTS

| | | | | |
|---|---|---|---|---|
| 5,442,552 A | * | 8/1995 | Slaughter et al. | 701/50 |
| 5,956,079 A | * | 9/1999 | Ridgley | 348/89 |
| 6,003,455 A | * | 12/1999 | Flamme et al. | 111/200 |
| 6,025,790 A | * | 2/2000 | Saneyoshi | 340/946 |
| 6,041,582 A | * | 3/2000 | Tiede et al. | 56/10.2 A |
| 6,070,673 A | * | 6/2000 | Wendte | 172/2 |
| 6,311,795 B1 | * | 11/2001 | Skotnikov et al. | 180/8.3 |
| 6,490,539 B1 | * | 12/2002 | Dickson et al. | 702/150 |

* cited by examiner

Primary Examiner—Bhavesh M. Mehta
Assistant Examiner—Seyed. Azarian
(74) Attorney, Agent, or Firm—Rebecca Henkel; Brant T. Maurer

(57) ABSTRACT

A combine having a camera system is disclosed in which pictures of the ground in front of the vehicle are processed to extract the slope and intercept of a characteristic line indicative of the boundary between the cut and uncut portions of the field. A fuzzy logic algorithm compares the slope and intercept using four input membership functions and a single output membership function. If the slope and intercept extracted from the image are deemed acceptable, they are used to navigate the vehicle through the field. If they are not acceptable, the combine continues to use slope and intercept values previously deemed acceptable to guide the vehicle. This process of image data extraction and quality analysis continues repetitively as the combine traverses the field harvesting crops.

17 Claims, 11 Drawing Sheets

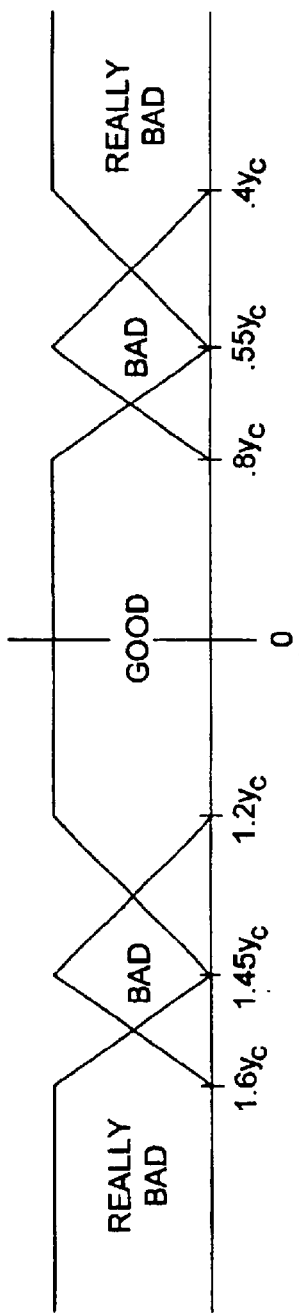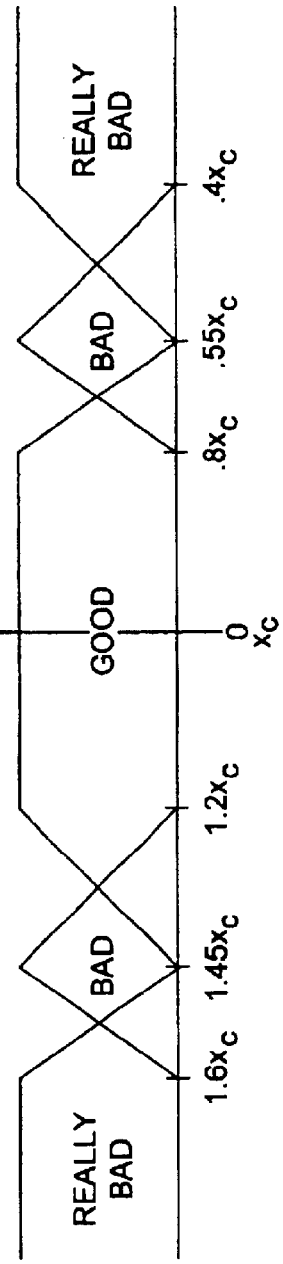

METHOD AND APPARATUS FOR AUTOMATICALLY STEERING A VEHICLE IN AN AGRICULTURAL FIELD USING A PLURALITY OF FUZZY LOGIC MEMBERSHIP FUNCTIONS

CROSS-REFERENCES TO RELATED APPLICATIONS

The present application is related to "A Method and Apparatus for Processing an Image of an Agricultural Field" filed by Benson, et al. on an even date herewith.

FIELD OF THE INVENTION

This invention relates generally to automatically steering agricultural vehicles in agricultural fields.

BACKGROUND OF THE INVENTION

With the advent of fast microprocessors, and inexpensive video cameras, researchers have recently begun to develop systems for guiding agricultural vehicles in agricultural fields. These systems are of particular benefit for cultivating equipment such as combines, harvesters, sprayers, rakes, harrows, or other implements. In most of these applications, the cultivating equipment needs to follow a very specific track through the field to efficiently cultivate the field. For example, when plowing a field the rows must be spaced a predetermined distance apart and should vary from adjacent rows by only a few inches. When spraying a crop, the sprayers traverse the field resting on their wheels, and must travel precisely between adjacent rows of previously planted crops. Again, this requires that the vehicle navigate a path that can vary only by a few inches. Harvesting crops also requires considerable accuracy to maintain the alignment between the harvesting head and the rows of crops that are harvested. Should the harvesting head drift more than a few inches to either side, it would begin to crush the crops rather than harvest them.

One of the things that makes automatic control of these processes particularly suitable was the presumed ability of video cameras to detect particular rows, spaces between rows, or the cut/uncut boundary of a field. Since the farmer, when manually guiding the vehicle, visually follows these features of the field, it is presumed that devising a camera that could extract this data and follow the same characteristics would be relatively easy. This has not proven to be the case.

Early attempts to use video cameras and image processors to receive and extract information indicative of a crop row, the space between rows or the cut/uncut boundary, were difficult to devise. Since crops vary widely in their height, their color, the "lushness" of growth, as well as their spacing, it was difficult to create a single method that would provide consistent edge or line detection of these features. Furthermore, agricultural fields during cultivation can be obscured by dust, dirt, flying plant matter or other objects straying into the field of view of the camera. All these problems have made the development of guidance and control systems quite difficult.

Even if the image processing and feature extraction (i.e., extracting the location of a crop row, the gap between crop rows, or the cut/uncut boundary) were possible, the accuracy of the guidance system did not prove sufficient to steer the vehicle within the few inches of permissible error.

In our previous applications entitled "A Method And Apparatus For Processing An Image Of An Agricultural Field" filed Jul. 10, 2000 and granted Ser. No. 09/612,688 and "A Method And Apparatus For Determining The Quality Of An Image Of An Agricultural Field Using A Plurality Of Fuzzy Logic Input Membership Functions", filed on even date therewith, and granted Ser. No. 09/612,851, we described in some detail how the first of these problems could be solved. The second problem, that of controlling the location of the vehicle based upon the data extracted from each image frame, was not addressed.

In the present application, we describe the overall process of image processing and vehicle control in a manner that addresses both of the aforementioned difficulties.

SUMMARY OF THE INVENTION

In accordance with the first embodiment of the invention, a method of guiding an agricultural vehicle having at least one steerable wheel in an agricultural field having a plurality of rows of crops is provided, including the steps of taking a picture of the rows of crops with an electronic camera, successively processing a plurality of lines of the picture, extracting from the plurality of processed lines at least one value indicative of a crop line, extracting another value from the at least one value that is indicative of the lateral displacement of the crop line with respect to the vehicle, processing the another value in a fuzzy logic input membership function, then a fuzzy logic inference engine and then a fuzzy logic output membership function to develop a signal indicative of the degree the at least one steerable wheel should be turned, providing the signal indicative of the degree to which the steerable wheel should be turned to a feedback control circuit configured to steer the at least one steerable wheel in a direction that minimizes the difference between the signal indicative of the degree the at least one steerable wheel should be turned and another signal indicative of the degree to which the at least one steerable wheel is actually turned, generating a valve control signal calculated to reduce the difference, applying the valve control signal to an electro-hydraulic control valve configured to steer the at least one steerable wheel, and steering the wheel accordingly.

The step of extracting another value may include the step of extracting values sufficient to define a line indicative of a row of crops, a gap between a row of crops, or a cut/uncut boundary in a field. The step of processing the another value may include the step of processing the another value in the input membership function to produce at least a first input value indicative of a degree of membership in a first input membership function domain and a second input value indicative of a degree of membership in a second input membership domain. The step of processing the another value may include the step of processing the first and second input values in the fuzzy logic inference engine. The output membership function may include at least three domains symmetric with respect to a steering angle of zero. The at least three domains may include a center domain wherein a 100% membership causes the at least one steerable wheel to move toward or to remain in a mode of straight line travel. Two of the at least three domains may be symmetrically disposed on either side of the center domain. The at least three domains may include two additional domains that are symmetrically disposed on either side of a center of the center domain.

In accordance with a second embodiment of the invention, a method of guiding an agricultural vehicle having at least one steerable wheel in an agricultural field having a plurality of crops rows is provided included the steps of taking a picture of the crop rows with an electronic camera, extracting from the pictures row location values indicative of a location of at least one crop row, determining based upon at least one previous row location value whether the row location values are valid, and for each such row location values that are determined valid: deriving therefrom a value indicative of a desired direction of travel, processing the value indicative of a desired direction of travel in a fuzzy logic inference engine to produce a control signal, providing the control signal to an automatic control loop that uses feedback control based upon the position of the at least one steerable wheel to generate a valve command signal, applying the valve command signal to an electro-hydraulic steering control valve, and for each row location value that is determined invalid: not using such invalid row location value in the automatic control loop.

The step of deriving therefrom a value may include the step of processing the row location value in a first fuzzy logic control circuit. The value indicative of a desired direction of travel may be a value indicative of a desired steering angle or a desired steering rate. The step of determining whether the row location values are valid may include the step of processing the row location values in a second fuzzy logic control circuit. The row location values may include values sufficient to define a line having a slope and an intercept in the image frame from which the row location values were extracted. The row location values may be indicative of a crop row, a cut/uncut boundary in the field, or a gap between crop rows. The first fuzzy logic control circuit may include at least one fuzzy logic input membership function to process at least one of the row location values and a second fuzzy logic input membership function to process at least another of the row location values. Both of these row location values may be extracted from a single image frame.

BRIEF DESCRIPTION OF THE DRAWINGS

Preferred exemplary embodiments of the present invention are illustrated in the accompanying drawings in which like reference numerals represent like parts throughout, and in which:

FIG. 7 illustrates an alternative fuzzy logic slope input membership function that adapts to changes in previously acceptable signal values;

FIG. 8 illustrates an alternative fuzzy logic intercept membership function that adapts to changes in previously acceptable intercept values;

DETAILED DESCRIPTION OF THE PREFERRED EMBODIMENTS

Figure 1:
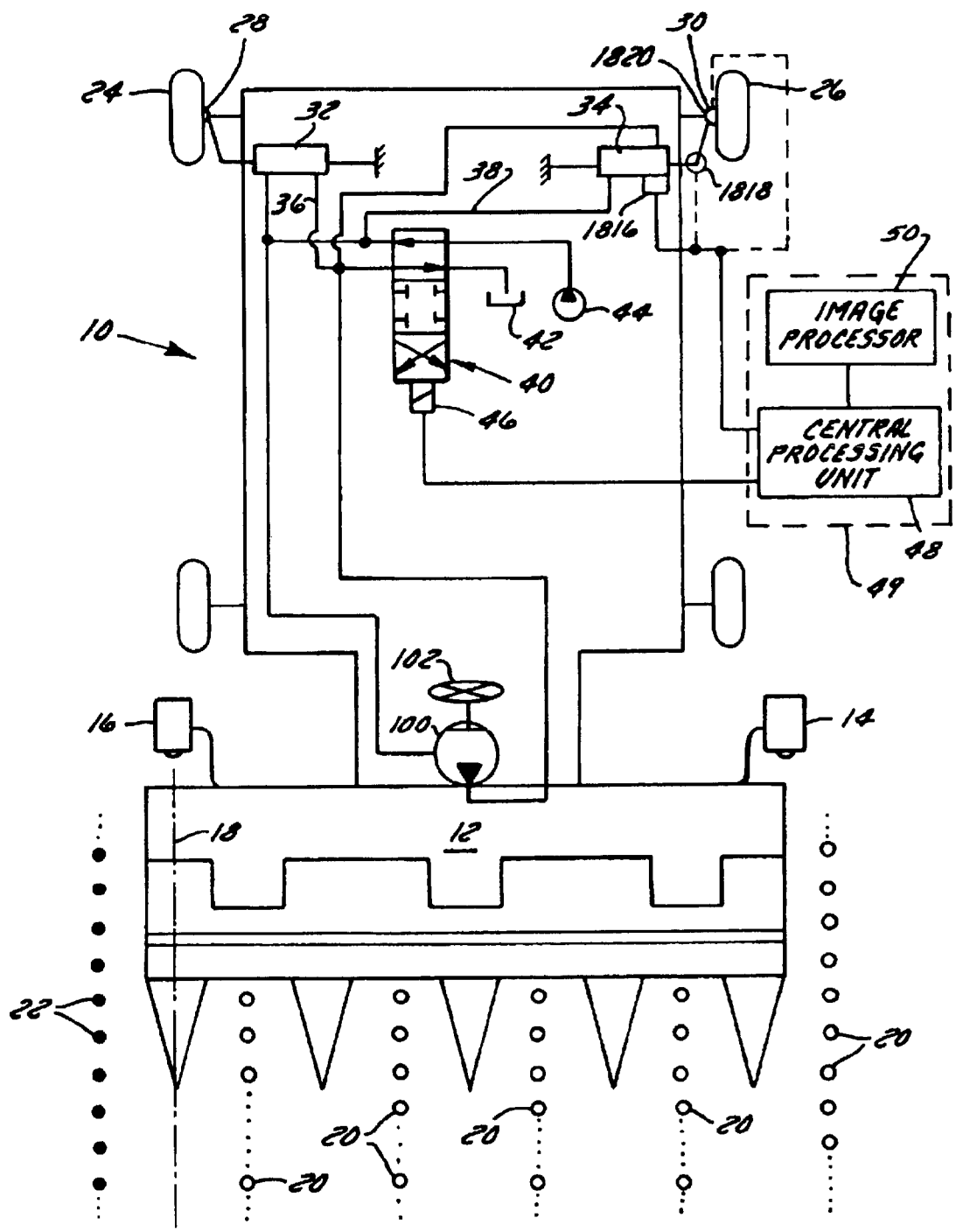
FIG. 1 is a plan view of an agricultural combine showing its header with cameras mounted proximate to each end, a control circuit for monitoring the cameras, and various guidance components for steering the vehicle through the field during harvest.

FIG. 1 is a plan view of a combine 10 having a harvesting head 12, here shown as a corn head, for harvesting a crop. Two cameras 14 and 16 are disposed at opposite sides of the combine preferably on the corn head 12 such that they point forwards and are horizontally aligned with boundary 18 between the cut and uncut regions of the field. The small circles 20 indicate corn plants (uncut crops) and the small dots 22 indicate stalks of already cut corn plants. With two cameras, the vehicle can harvest a crop with both its left side and right side adjacent to the cut/uncut boundary of the field.

Figure 2:
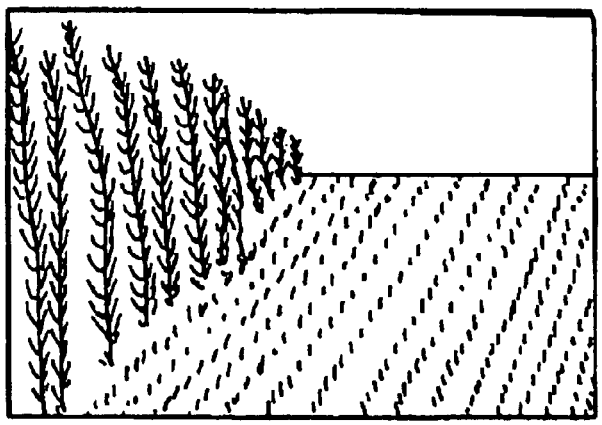
FIG. 2 represents a typical image of the field in front of the combine of FIG. 1 as it travels down the field along the cut/uncut boundary of the field harvesting a crop, here shown as corn.
Figure 3:
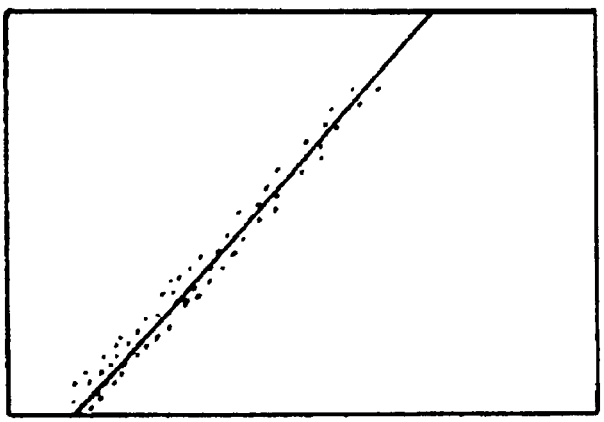
FIG. 3 illustrates the characteristic points on each scan line indicative of the boundary between the cut and uncut regions of the field extracted from the sample image of FIG. 2.
Figure 4:
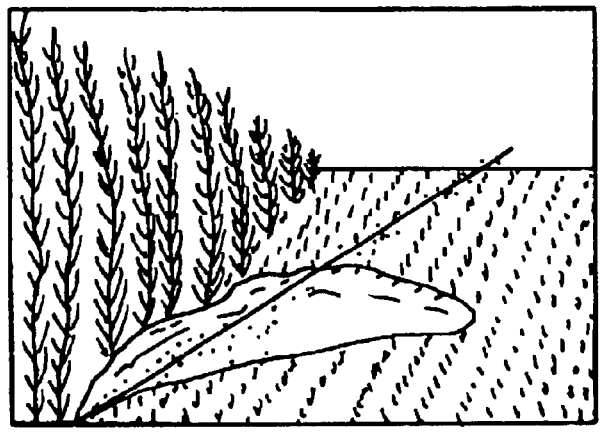
FIG. 4 represents a sample erroneous camera image of the field showing the field and also a stray corn leaf appearing in front of the camera just as the picture is taken, wherein the scattered dots and straight line indicate the characteristic points and the characteristic line, respectively, that would be extracted from this invalid image.

The combine can reverse direction in the headlands of a field. When this occurs, the camera used for gathering images will be changed from camera 16 (the one used in the FIG. 1 embodiment to take the picture shown in FIG. 2) and camera 14. Camera 14 would be used when the combine follows the same path, but in the opposite direction along the cut/uncut boundary.

Two rear wheels 24, 26 pivot about pivot points 28, 30 to steer the combine. Hydraulic cylinders 32, 34 are coupled between the chassis of the combine and the rear wheels to steer them to the left and right. Cylinders 32 and 34 are filled or evacuated through hydraulic lines 36, 38, respectively.

These lines are coupled to proportional control valve 40, which in turn is coupled to hydraulic tank 42 and hydraulic pump 44.

Proportional control valve 40 is driven by electrical solenoid 46 which is coupled to and controlled by central processing unit 48 of control circuit 49. Central processing unit 48 determines the magnitude of the signal applied to proportional control valve 40, and hence the direction that the combine is steered. This calculation is based upon an analysis of the images received from the cameras. A manual hydraulic pump 100 is coupled in parallel to valve 40. It is driven by combine steering wheel 102.

The central processing unit together with the image processor (which collectively comprise control circuit 49) extract a slope and an intercept from each of the sequential images transmitted by the camera 16 that travels along the cut/uncut boundary line or the camera 14 that travels along a row of crops or the gap between adjacent rows of crops.

Image processor 50 receives and processes the images transmitted by cameras 14 and 16. Central processing unit 48 determines the appropriate direction that the wheels should be turned and generates the command signal that is applied to the proportional control valve 40 to steer the combine. This guidance and control is shown in block 510 of FIG. 5 and in more detail in FIGS. 15–18 and the accompanying text.

Figure 5:
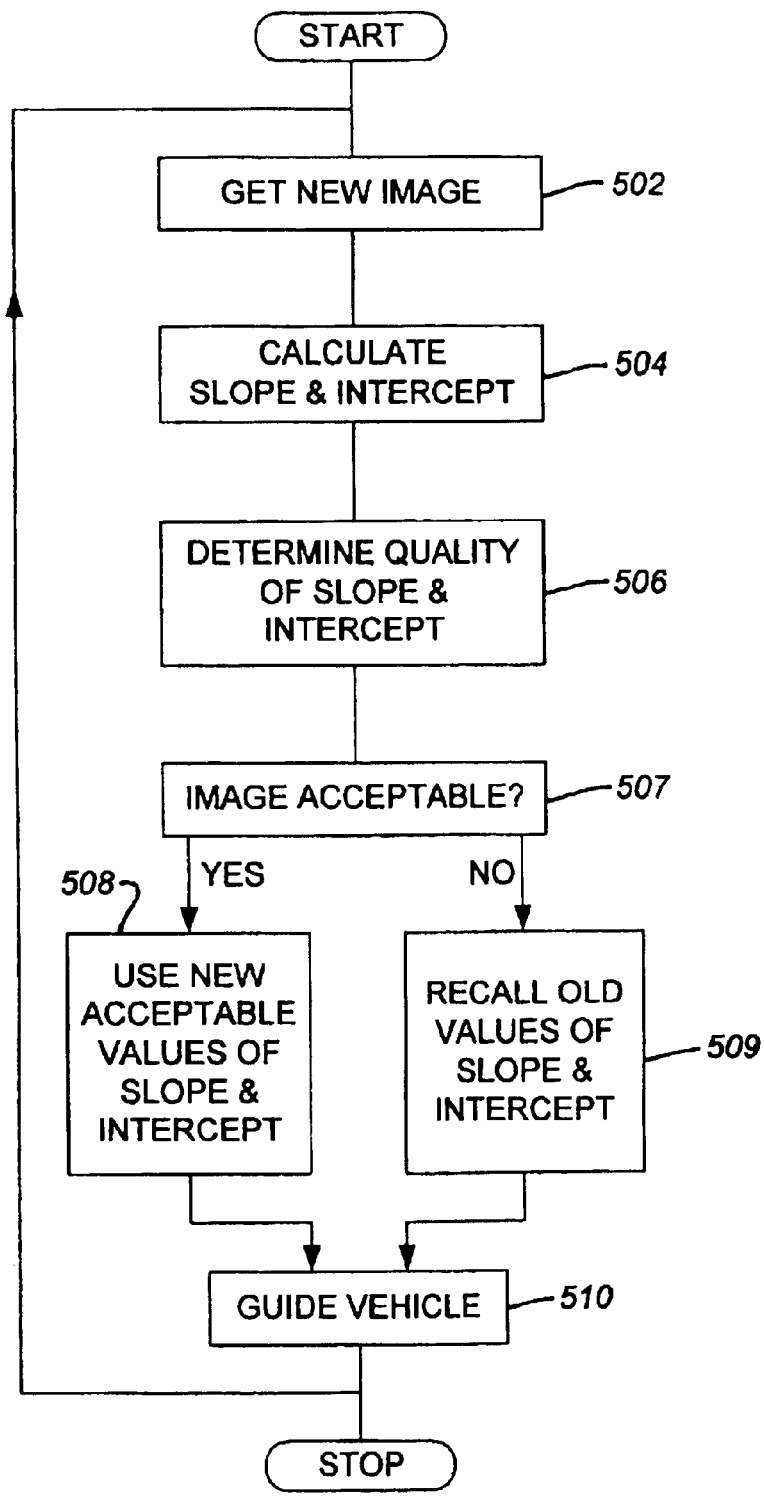
FIG. 5 is a flow chart of the processing performed by the control circuitry of the combine to retrieve the image, process it, extract the characteristics of the scene shown in the image, determine whether they are good, and apply them (if good) to the guidance system to steer the combine toward the proper path.

FIG. 5 is a flow chart of the steps performed by the control circuitry (the image processor and the central processing unit) to gather and process the image, determine the quality of the signal derived from them, and to steer the combine in the right direction to keep it on course. This FIGURE indicates the control algorithm that is used during harvesting. Before it is engaged, the combine must be maneuvered close to the cut edge of the field.

The farmer, using the steering wheel, manually guides the combine until longitudinal axis (the axis of the vehicle parallel to the direction of travel when the vehicle is going in a straight line) is substantially parallel with the boundary between the cut/uncut regions of the field. The vehicle is also positioned such that the row of uncut crop closest to the cut/uncut boundary is harvested by a lateral end portion of the header and the vehicle is aligned such that the camera points down along the boundary line. This is the position shown in FIG. 1. Once the combine is in this position, the guidance system is engaged and the algorithm of FIG. 5 begins executing.

Referring to FIG. 5, the process starts in step 500. The system then gathers an image from the camera proximate to the cut/uncut boundary of the field (step 502) or from the camera on the other side of the vehicle that views adjacent rows of crops and a gap between adjacent rows.

As the control circuit 49 executes the programmed algorithm and fetches each image from the camera, the image processor extracts the slope and intercept of the cut/uncut boundary line from the image (step 504).

The steps of fetching the image and calculating the slope and intercept are described in more detail in the co-pending application identified above.

Once the slope and intercept of the characteristic line are calculated, the central processing unit then determines the quality of those signal values (step 506). This step is explained in greater detail in accordance with FIG. 6, below.

If the slope and intercept are valid and acceptable (step 507), the system then recalculates the appropriate control signal to be applied to the proportional control valve 40 based upon the new slope and intercept signal values (step 508) and applies that revised signal to the proportional control valve (step 510). The steps recalculating and applying are described in more detail in FIGS. 15–18 and the accompanying text.

By changing the signal provided to the proportional control valve, fluid is redirected into the hydraulic steering cylinders (FIG. 2) and the vehicle is steered in a new direction.

The logic for navigating the vehicle using the slope/point values is relatively simple. A perfectly vertical cut/uncut boundary line (i.e. a slope approaching infinity) indicates that the camera is located directly over the cut/uncut boundary. With the camera mounted on the header as shown in FIG. 1, this is the preferred position for harvesting. With a perfectly vertical line, the intercept should be approximately in the middle of the image frame if the camera is pointed straight ahead of the vehicle. If the intercept is off to the left side of the image, the vehicle is turned toward the intercept line. If the intercept is off to the right of the image, the combine is turned toward the right. As described below, a single value, the row location value, is extracted from the point and slope to give the lateral location of the boundary (or row, or gap between rows depending on the camera used). This row location value is supplied to the vehicle control algorithm to steer the vehicle.

As the combine moves away from the proper line of travel, the slope of the cut/uncut boundary increases. For example, if the combine is a hundred feet away from the cut/uncut boundary and is facing the boundary, it will appear as a flat straight line extending from left-to-right across the image, and the x-axis intercept will approach infinity. This is equivalent to a slope of zero and an infinite absolute intercept value. The particular algorithm employed depends upon the camera selected, the size of the lens, the direction the camera is pointed, and the height of the camera above the ground.

Finally, if the slope and intercept of the image are not deemed to be valid and acceptable (step 507), they are ignored. They are not used to navigate the vehicle, and the previous historical values of slope and intercept are used instead (steps 509–510).

The process of FIG. 5 is repeated ad infinitum until the combine reaches the end of the row and must turn around. In the headlands of a typical cornfield, there are no cut and uncut boundaries. The vehicle is steered in a semi-circular path until it faces the cut/uncut boundary from the opposite direction, at which point the farmer turns the steering wheel to return along the original path from the opposite direction. Once the combine is properly aligned, the control circuitry is again engaged, and takes over control of the steering cylinders 32 and 34.

Since the combine's direction has been reversed, the other side of the header is aligned with the cut/uncut boundary, and the other camera is used to fetch images of the field. This can happen automatically, for example by calculating a characteristic line from both cameras and then seeing which one is acceptable. The one that is deemed a better fit is then used as the controlling camera. It is relatively easy to distinguish between the two images. The system will be unable to extract a characteristic line from an image of the camera that is not aligned with the cut/uncut boundary.

In some applications, the combine will harvest an entire field without reversing direction in a headland. For example, large wheat fields are harvested in a long spiral path. As the wheat is cut, the vehicle travels along a tighter and tighter spiral around the periphery of the field turning gradually, yet keeping the same side of the header aligned along the cut/uncut boundary. In situations such as this, the system may be engaged to guide the vehicle almost continually until the entire field is completely harvested.

Fuzzy Quality Analysis

When the guidance system is disengaged in the headland turning zones of a field, all fluid communication between the pump 44 and the tank 42 through the proportional control valve 40 is blocked. The only way fluid can be communicated to the hydraulic cylinders when the guidance system is disengaged is by manually steering the vehicle using manual pump 100 which is coupled to and driven by the steering wheel 102 of the combine in a conventional manner.

Figure 6:
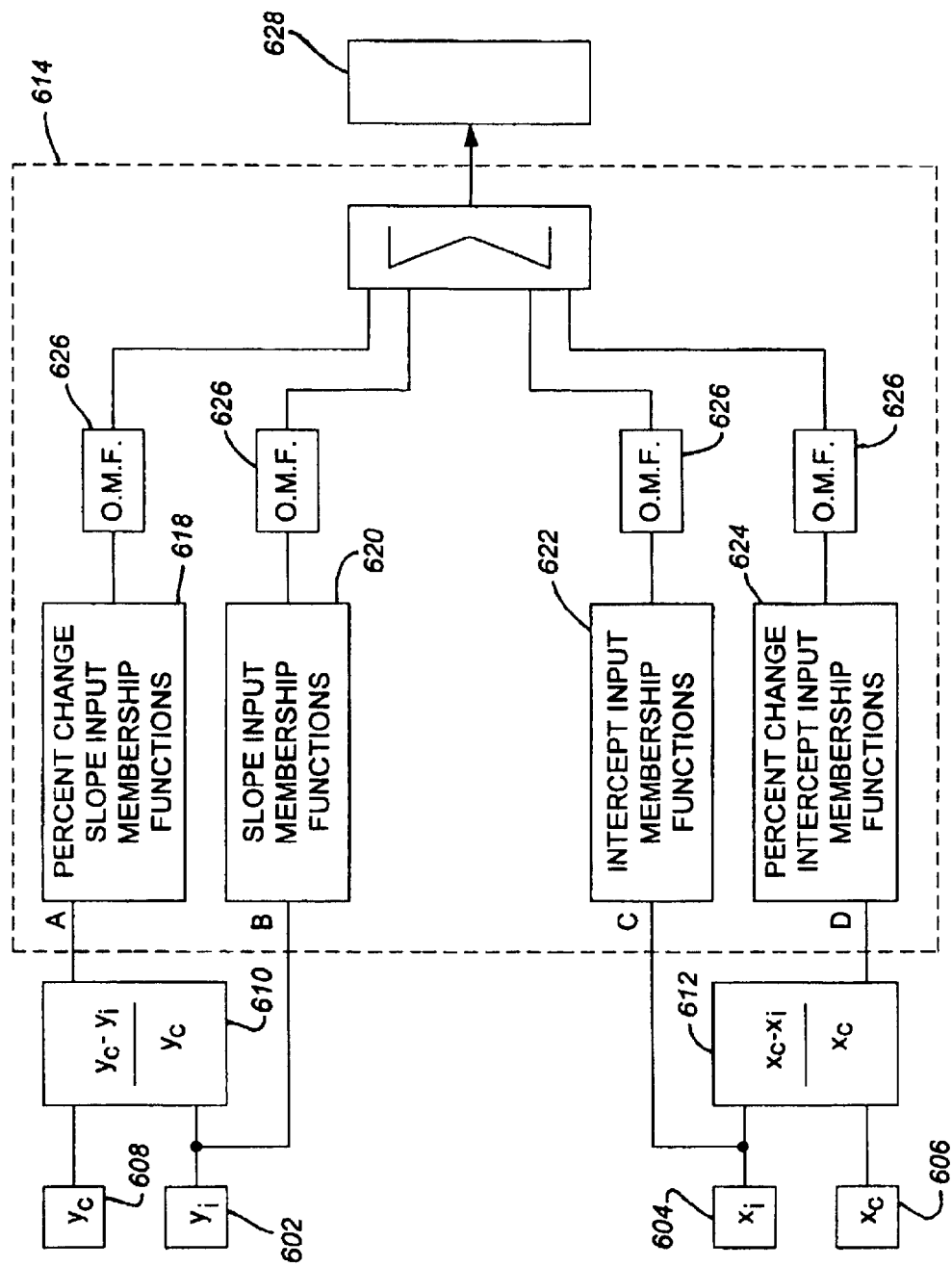
FIG. 6 illustrates the details of the fuzzy logic algorithm implemented by the control circuitry to analyze the characteristic slope and intercept of each image in turn and to determine whether the slope and intercept are valid/acceptable to be used for guiding the vehicle.

Details of the fuzzy logic quality analysis performed in step 506 are shown in FIG. 6. The quality analysis is performed on characteristics of a field that are extracted from the cameras of FIG. 1, namely the slope and intercept of the characteristic line. The analysis is just as applicable, however, to any sensor signal gathered from any sensor. For that reason, we refer to the slope and intercept being evaluated interchangeably as "sensor signals" or "signals" in the discussion below.

The signals extracted from the current image are the slope and intercept of the cut/uncut boundary in the field. These signal values are indicated as "$y_i$" (the slope that is being evaluated), and "$x_i$" (the intercept that is being evaluated) in FIG. 6 and are shown in blocks 602 and 604, respectively.

Historical signal values indicative of a previously processed image are also used in determining the quality of the current signal values in the preferred embodiment. These historical signal values are indicated in FIG. 6 as "$x_c$" 606 (the historical intercept value) and "$y_c$" 608 (the historical slope).

When there is an extreme change in signal values from measurement to measurement (e.g. in this case from image to image) it is likely that the current signal value being evaluated is invalid and therefore unacceptable. In order to determine whether or not there has been an extreme change in signal values over time, previous signal values, or an anticipated sensor value based upon the previous values must be compared with the current signal values being evaluated.

In the present system, the data indicative of previously acceptable signals are a previously acceptable slope, "$y_c$" and a previously acceptable intercept, "$x_c$". As shown in FIG. 5, the image processing is iterative performed successively on a series of images received from camera as the vehicle travels down the field. As a part of this process, the signal values "$y_c$" and "$x_c$" were calculated, qualified and deemed acceptable. These prior calculated acceptable sensor values from a previous image are used in FIG. 6 as the $y_c$, and $x_c$ values of blocks 610 and 612, respectively. As each new slope and intercept are deemed to be acceptable, they become the new "$y_c$" and "$x_c$" for the next slope and intercept being evaluated. In other words, at the end of the quality evaluation illustrated in FIG. 6, if $y_i$ and $x_i$ are deemed to be acceptable they will be saved and will become the $y_c$, and $x_c$, used when the next image is processed according to FIG. 6.

In the embodiment of FIG. 6, it is the previous acceptable or valid signal levels $y_c$, and $x_c$ that are compared with the current signal values $y_i$ and $x_i$. Nonetheless, it should be recognized that there are other ways of incorporating the historicity of the signals, the slope and intercept, into the a quality analysis. For example, rather than using a single prior acceptable sensor signal value, an average of the last few acceptable signal values can be used. Alternatively, a time series of several of the previously acceptable signal values can be used.

The historical acceptable signal values $y_c$ and $x_c$ are combined in blocks 610 and 612 with the current signal values $y_i$ and $x_i$ in order to determine the degree of variation or difference between them. As the variation or difference between the slopes and the intercepts increases, it is more likely that the current signal values are invalid and therefore unacceptable. The slope and intercept should change relatively slowly as the combine turns. A sudden change is indicative of an erroneous signal value.

In block 610, the central processing unit calculates the percent change in the slope signal value and in block 612, it calculates the percent change in the intercept signal value.

While this is the preferred method of determining the variation or difference between the historical and current slope and intercept signal values, there are several other ways to provide a value indicative of the amount of difference. For example, the absolute difference between the signal values (e.g. $y_c-y_i$ and $x_c-x_i$) could be used.

Once calculated, the difference signals and the raw slope and intercept signals, are used as inputs "A", "B", "C", and "D" to the fuzzy logic quality analysis module 614 shown in FIG. 6. The first two of these signals, A and B, are derived from sensor signal $y_i$. "A" represents the change or difference between current signal $y_i$ and historically acceptable signal $y_c$. "B" represents the signal $y_i$ itself. Similarly, values C and D are derived from another sensor signal: $x_i$. "C" represents the signal $x_i$ itself, and "D" represents the change or difference between signal $x_i$ and previously calculated historically acceptable signal value $x_c$.

These four values, A, B, C and D, are used as inputs to fuzzy logic quality analysis module 614. Module 614 includes, in its preferred embodiment, several input membership function modules that are used to calculate a factor indicative of the acceptability of signal A (slope $y_i$) that is being evaluated and the historical signal B (slope $y_c$). The greater the current signal varies from the historical signal value, the greater the likelihood that the current signal is invalid.

Figure 9:
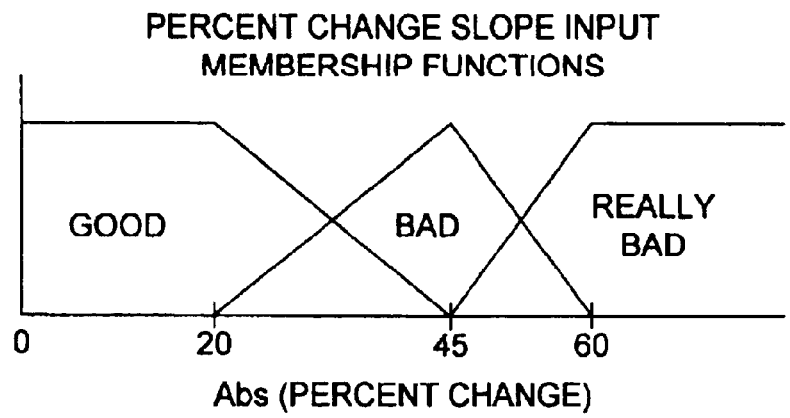
FIG. 9 details the operation of the percent change in slope input membership functions.

The first of these modules is module 618, the percent change in slope input membership functions. Regarding the input membership functions of module 618, and as shown in more detail in FIG. 9, we can see that as long as a change in slope from image to image is less than 20 percent, $y_i$ will be a 100 percent member of the "Good" set. As the percent change in slope moves toward 45 percent from 20 percent, signal $y_i$ becomes increasingly a member of the "Bad" set and less a member of the "Good" set.

Finally, as a percent change in slope moves from 45 to 60 percent, signal $y_i$ becomes increasingly a member of the "Really Bad" set and less a member of the "Bad" set.

The outputs of each the input membership functions of module 616 are defuzzified preferably by using the center-of-gravity technique. The output of the percent change slope input membership function will therefore change if either the historical signal value or values ($y_c$) or the current signal value ($y_i$) change. The historical signal value, $y_c$, can therefore be considered in one sense to modify the operation of the percent change slope input membership functions.

We cannot know, from given signal value, $y_i$, what the output of the percent change slope input membership functions will be. The function is dependent upon historical value $y_c$ as well as $y_i$.

Instead of providing a percent change slope input membership functions that varies with a previously accepted slope, $y_c$, a different membership function that takes $y_i$ as an input and has an x-axis defined as a function of $y_c$, would also provide substantially the same benefit. This alternative function would replace block 610 and could have been modified directly, as shown in FIG. 7 by making the x-axis dependent on the value of $y_c$, or another time varying estimate of the slope. As shown in FIG. 7, the x-axis of the membership function is based upon a previously acceptable slope, $y_c$. FIG. 8 shows similar alternative intercept input membership functions that receive $x_i$ as an input, and wherein the x-axis of the function is calculated based on the changing value of $x_c$.

Figure 10:
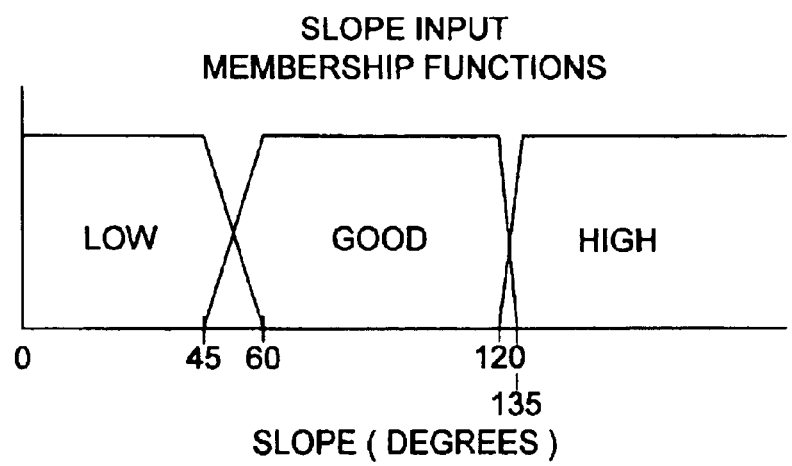
FIG. 10 details the operation of the slope input membership functions.

Module 620 in FIG. 6 illustrates the slope input membership functions, generally. Details of these functions are shown in FIG. 10. These functions work directly on the signal value, $y_i$, itself. If the slope $y_i$ is between 60 and 120 degrees, the slope is a 100 percent member of the "Good" set. As the slope changes from 60 to 45 degrees and from 120 to 135 degrees, the slope is increasingly bad (either too low, or too high). Any slope below 45 degrees or above 135 degrees is 100 percent bad.

Figure 12:
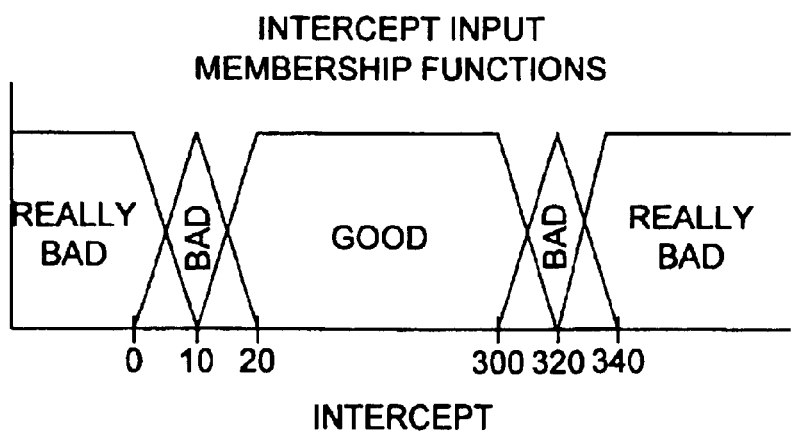
FIG. 12 details the operation of the intercept input membership functions.

Module 622 in FIG. 6 illustrates the intercept input membership function which processes value "C" indicative of signal $x_i$ that is being evaluated. Details of the intercept input membership functions are shown in FIG. 12. The output of the intercept input membership function is a value indicative of the acceptability of the intercept signal value being evaluated for acceptability and invalidity. The intercept input membership function is shown in more detail in FIG. 12. Referring now to FIG. 12, any intercept having a value between 20 and 300 is considered 100 percent "Good". As the intercept value transitions between 20 and 10 and between 30 and 320, the intercept is considered increasingly bad and decreasingly good. As the intercept drops below 10 and increases above 320, the intercept signal value ($x_i$) is increasingly "Really Bad" and decreasingly "Bad".

Figure 11:
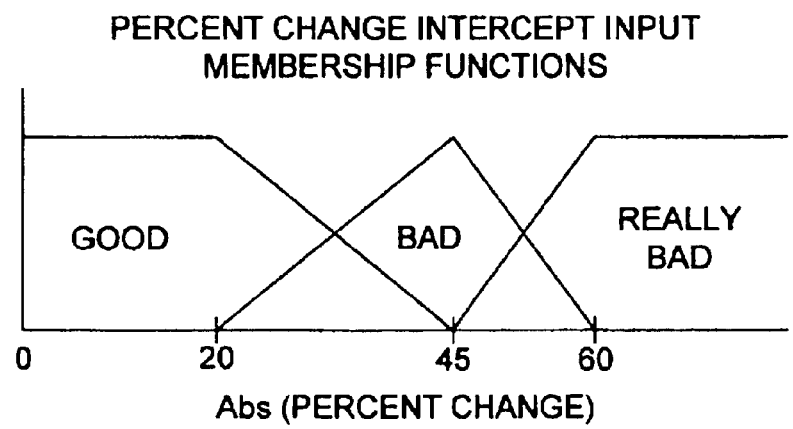
FIG. 11 details the operation of the percent change in intercept membership functions.

Module 624 in FIG. 6 illustrates the fuzzy logic percent change intercept input membership functions. Details of these functions are shown in FIG. 11. These functions receive value "D", indicative of the variation or difference between the signal value being tested, $x_i$, and the historical signal value, $x_c$. The membership functions themselves are shown in more detail in FIG. 11. Referring now to FIG. 11, if the percent change in the intercept (i.e., the value D) is 20 or less, the intercept is considered to be 100 percent "Good". As the percent change in the intercept varies between 20 and 45 percent, the intercept is deemed to be increasingly "Bad" and less "Good". As a percent change intercept varies from 45 to 60 percent, the signal value, $x_i$, is deemed to be increasingly "Really Bad", and decreasingly "Bad".

Figure 13:
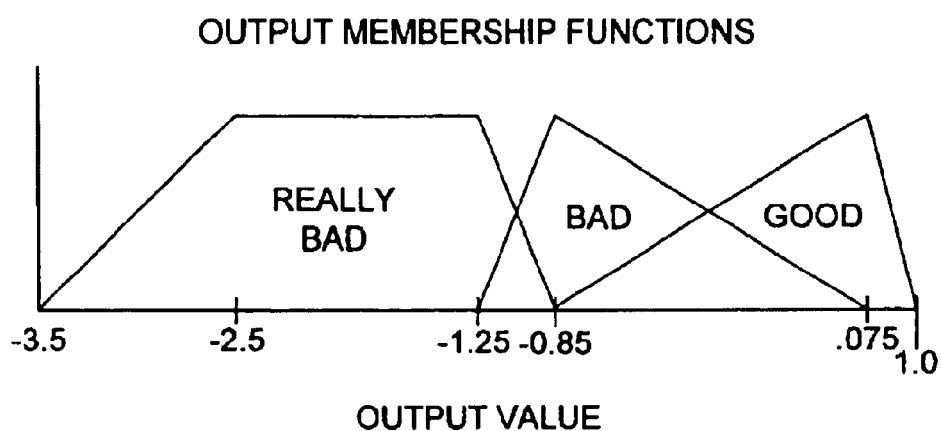
FIG. 13 details the operation of the output membership functions.

All the four modules of input membership functions are defuzzified and reduced to a single value, preferably using the center-of-gravity technique, and are then used as inputs to the output membership function shown in module 626. This membership function is shown in more detail in FIG. 13. The output membership function combines all of the input membership functions and outputs a single value that is then thresholded at block 628 to provide an acceptable/ unacceptable determination. The particular thresholding value will depend upon the particular components selected. In this manner, the slope and intercept sensor signals $y_i$ and $x_i$ are either determined to be acceptable or not acceptable, to be valid or invalid. As explained above, if they are acceptable, they become the new $y_c$ and $x_c$ used when the next image is processed, and they are also used to guide the vehicle. If they are not acceptable or valid, they are thrown out, and the old $y_c$ and $x_c$ are unchanged and are used again in the next iteration of the quality analysis of the next image that is processed.

Figure 14:
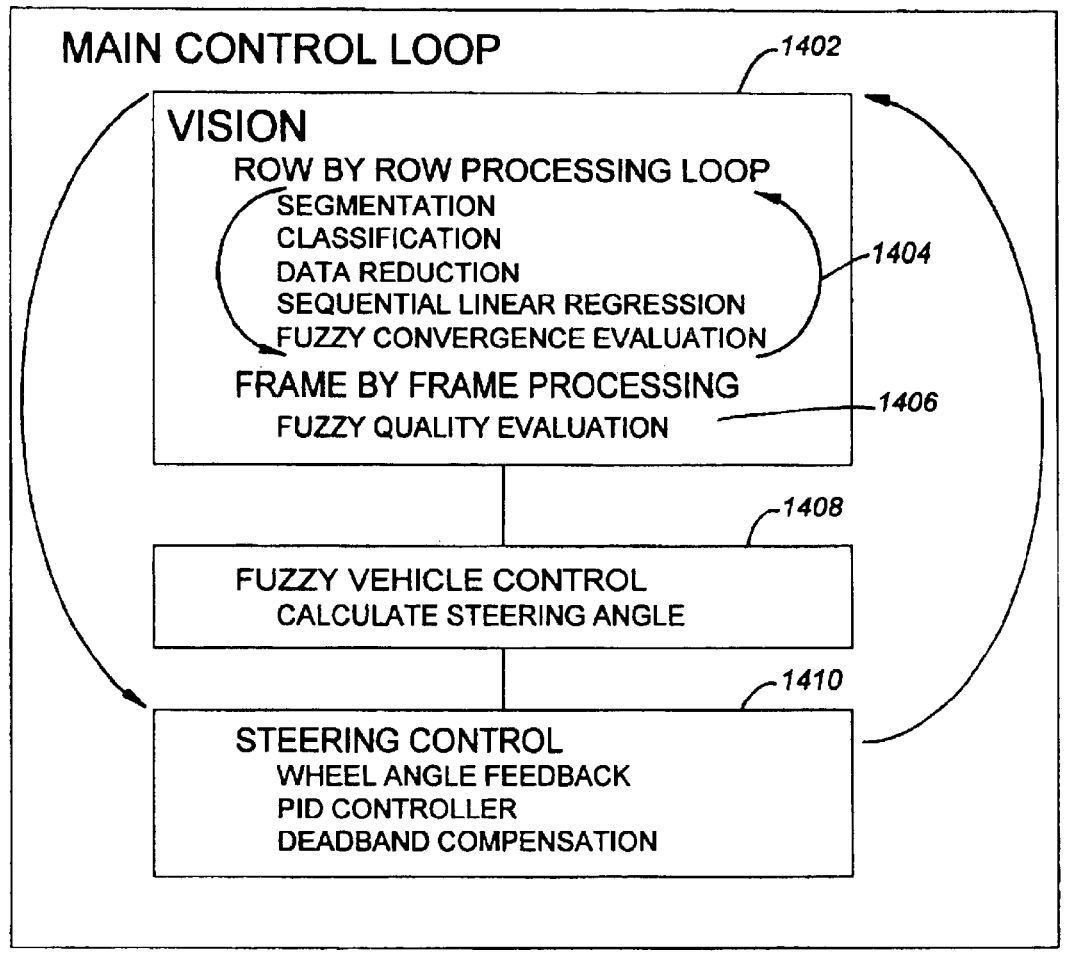
FIG. 14 is a block diagram of the main control loop performed by the control circuit to gather images from the cameras, process them, determine a crop line, generate a value indicative of a direction of travel and use that value in a feedback control loop responsive to a value indicative of the steered position of the vehicle's steerable wheels.

FIG. 14 illustrates the various processing steps performed by control circuit 49. First, the vision module 1402 processes the image. This is described in c-pending application Ser. No. 09/612,688. The actual row-by-row processing 1404 is repetitively performed to extract a point and slope from the image as described above.

Once the point and slope have been extracted from the image, the quality of these values is determined during frame by frame processing 1406. It is in this processing loop that the quality of a particular point and slope is evaluated as described in more detail above.

The final step is using the data extracted from the image (point/slope) to control the vehicle.

Fuzzy Vehicle Control

If the point and slope are deemed valid (i.e. acceptable) they are then used to determine the desired steering angle of the vehicle in the fuzzy vehicle control module 1408. This vehicle control is also shown in blocks 508 and 510 of FIG. 5.

To determine the desired steering angle, the central processing unit 48 selects a central point along the line identified by the slope and intercept value. This point is representative of the boundary between the cut and the uncut portion of the field (or a row, or a gap between rows) at a point slightly in front of the vehicle. As the vehicle drifts off toward the right, the line will move to the left in the field of view of the camera. As the vehicle drifts off the to left, the line will move to the right in the field of view of the camera.

This value, called a row location value, is calculated by the image processor 50 on the same unit basis that the slope and intercept are determined: pixel values. For example, using the preferred camera screen size of 640 pixels across by 480 pixels high, the midpoint of a typical point, intercept line could be about 320 pixels. Of course, the specific value and the specific height will depend upon the type of camera used and the location and orientation of the camera. If a camera were employed that was pointing quite low, the midpoint of the camera image would not be calculated, since it would not indicate the position of the cut and uncut boundary in front of the vehicle. Instead, one would calculate the lateral position of an upper portion of the line defined by the (point/slope) value. The type of camera, its orientation and location will all vary depending upon the application, the type of crops the particular vehicle on which it is mounted and hence no specific method for extracting a row location value, a value indicative of the lateral position of a crop row boundary or gap between rows is acceptable.

In this particular application, however, the lateral position of a point on the vertical midpoint of the line was used to indicate the position of a crop row in front of the vehicle. The point extracted from the image data indicates the position of the crop row with respect to the camera. The crop row itself does not move. The vehicle moves with respect to the crop row. Hence the position of the crop row indicated by the point reflects the vehicle's position with respect to the crop row. As the point moves to the left or the right in successive image frames, what it truly represents is the vehicle moving to the right or to the left with respect to the desired direction of travel. The point extracted from the image frame therefore represents the position of the vehicle with respect to the row of crops.

A fuzzy logic control circuit is used to determine the appropriate steering angle of the vehicle's front wheels. Referring back to the system diagram in FIG. 14, block 1408 illustrates this circuit. The fuzzy logic control circuit is embodied as a series of programmed instructions preferably executed on the image processor. These instructions automatically reconfigure the image processor hardware to determine the proper or desired wheel steering angle that will get the vehicle back on course. In this context, the vehicle is "on course" when the point extracted from the camera image (the row location value) is maintained in a predetermined position in each successive camera image.

In this embodiment, where the vehicle is a combine that is harvesting a standing crop, the line (i.e. the point/slope values) indicates the position of the crop with respect to the header of the combine to keep the header properly oriented with respect to the crop rows the header is cutting.

In the illustrated embodiment, the line that is extracted from camera 16 is the cut/uncut boundary of the field. Alternatively, camera 14 could be used. If camera 14 is used, the line (point/slope) does not represent the cut/uncut boundary, but a line indicating a crop row (or a space between crop rows) in front of the vehicle. This would be particularly useful for cultivating equipment such as tractors, sprayers, or other machines that go through a field without cutting a crop. It would also be beneficial in a harvester in which the crop rows are widely separated, such as soybeans, in which each crop row can be clearly and easily visually distinguished from its adjacent crop rows due to the well defined shape of the soybean plants and their wide row spacing with respect to their overall height as well as by the clear color difference between a green plant row and a brown soil gap between the rows. For many crops, it is easier to sense the direction of travel by orienting the camera to take a picture of the field in front of the vehicle and in the direction of travel (i.e. parallel to the crop rows). In these cases, the line extracted from the image and the point on that line extracted from the point/slope line data, would represent not a cut/uncut boundary, but a crop row itself, or a gap between two adjacent crop rows.

Returning to our discussion of the circuitry, however, the farther the vehicle drifts to one side or another, the farther the row location value extracted from the image moves left or right in each camera image. This is because the row location value extracted from the image is "fixed" to a particular crop row, or to a cut/uncut boundary (preferred in the case of a combine). By "fixed", we mean that the image processing described above that identifies a crop row gap, row of crops or a cut/uncut boundary will track that row or boundary as it moves in each successive camera image. Indeed, this is one of the benefits of the quality determination circuitry described above. If the line (point/slope) extracted from the image somehow "jumps" to the left or to the right in two successive image frames that are taken (such as by first indicating one crop row and then indicating an adjacent crop row) the quality determination process will identify this by the corresponding sudden change in intercept or in slope. These values will be ignored.

The farther the point extracted from the image drifts in successive images, the sharper the turn that is required to get the vehicle back on course. The sharper the turn that is required, the farther the wheels must be turned. The farther the wheels must be turned, the greater the steering angle of the steered wheels. Hence, in order to keep the vehicle on course as the row location value moves farther to the right, the steering angle must increase in a right-turning direction. Similarly, as the point drifts farther off to the left, the steering angle must increase in a left-turning direction.

Figure 15:
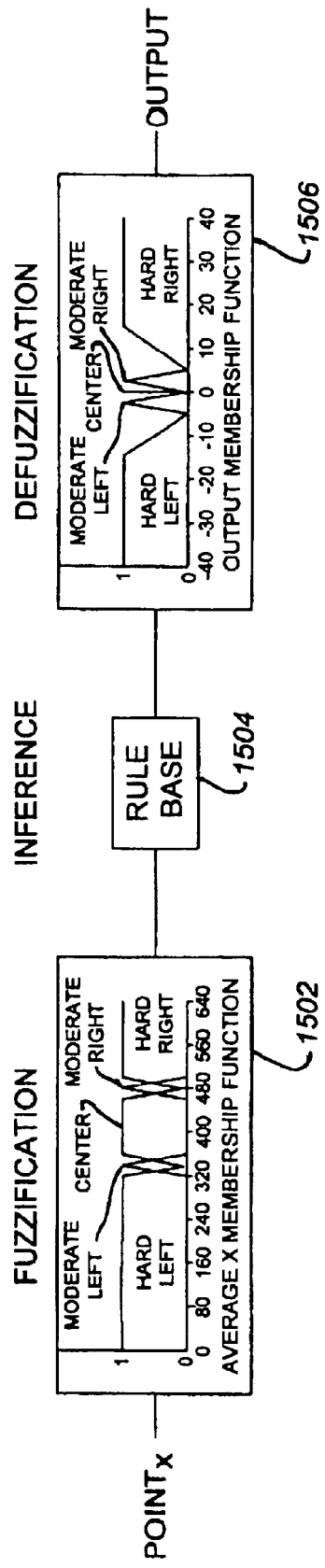
FIG. 15 is a block diagram showing the input fuzzification step, the fuzzy inference step and the output defuzzification step of the fuzzy vehicle control block shown in FIG. 14.
Figure 16:
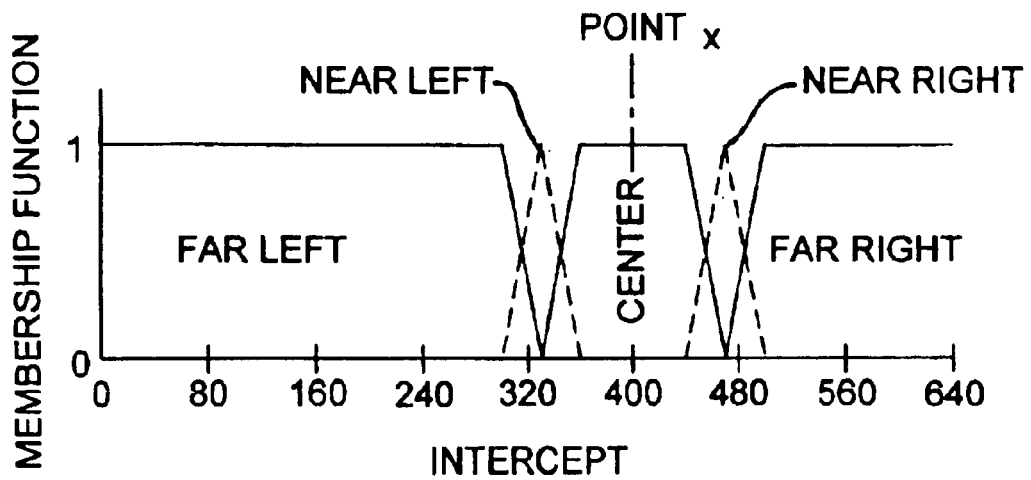
FIG. 16 illustrates the input membership function in the input fuzzification block of FIG. 15 the processes the row location value (in pixels)
Figure 17:
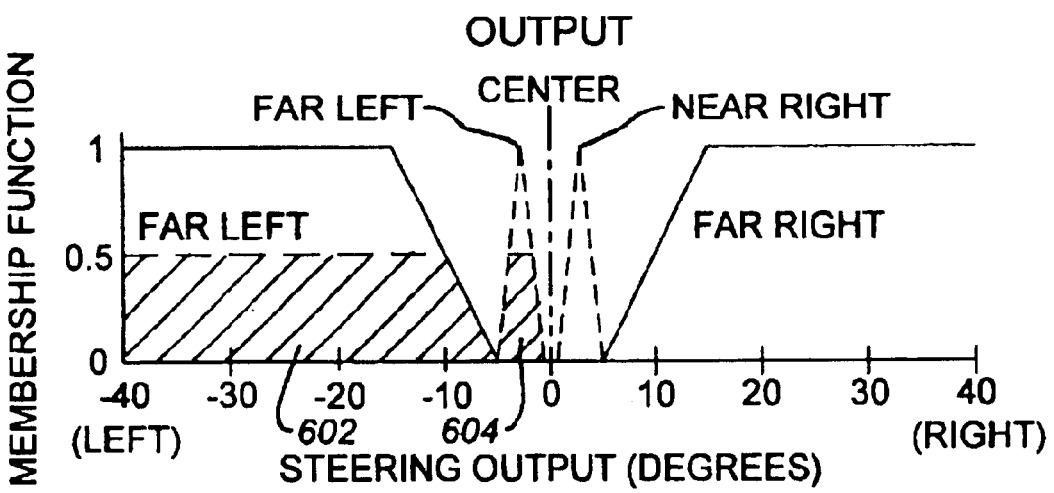
FIG. 17 shows the output defuzzification membership function shown in the defuzzification block of FIG. 15.

The circuit for monitoring this drift of the row location value from image-to-image and for generating a corresponding desired steering angle is shown in block 1408 of FIG. 14, and in FIGS. 15 through 17. FIG. 15 shows the basic operation of the circuit. In FIG. 15, the side-to-side position of the row location identified as "$point_x$" is the input to the function. In the preferred embodiment this is a value between 0 and 640 and indicates the location of the crop row gap between the rows or cut/uncut boundary at a location roughly in the middle of the picture. This value is then fuzzified in block 1502 to produce a fuzzy membership. The input function that fuzzifies the real valued "$points_x$", the lateral position of the point in the image frame, is detailed in FIG. 16.

Referring now to FIG. 16, the fuzzy vehicle control circuit 1408 takes the lateral pixel location of the point extracted from the image (the row location value) and coverts it into one or more fuzzy logic set memberships. Note that in the FIG. 16 graph the values of $point_x$ vary between 0 and 640. This is because the image frame has a 640 pixel width. Camera 16, in this example, was fixed to the vehicle such that the vehicle would be "on course" when the lateral position of the point was at 400 pixels.

Note that there are three domains. A center domain that is symmetric about the 400 pixel "on course" position, and near left and near right domains that are offset from the center of the center domain (400 pixels) to the left and to the right, respectively. These two domains are mirror images of each other spaced equidistantly from the 400 pixel or "on course" position of $point_x$. There are two more domains, a far left and a far right domain that are disposed even further from the "on course" 400 pixel location. These too, are symmetric with respect to each other around the 400 pixel $point_x$ value. The terms "far left", "near left", "center", "near right" and "far right" represent the position of the line in the image frame, and hence the position of the vehicle with respect to the rows of crops ahead of it.

To give some examples of the fuzzy logic domain that would result for various x locations of the row location value, a $point_x$ value of 400 would give a 100% membership in the "center" domain. A $point_x$ value of 160 pixels would give a 100% membership in the "far left" domain. A $point_x$ value of 560 pixels would give a 100% membership in the "far right" domain. A $point_x$ value of 325 pixels would give a 100% membership in the "near left" domain, and a $point_x$ value of 475 pixels would give a 100% membership in the "near right" domain. A $point_x$ value of 487 pixels would give a 50% membership in the "far right" domain and a 50% membership in the "near right" domain. Similarly, a $point_x$ value of 322 pixels would give a 50% membership in the "far left" domain and a 50% membership in the "near left" domain. Other values can be interpolated from the chart of FIG. 16.

The center domain is trapezoidal. It has a broad central section extending from 350 to 450 pixels in which the $point_x$ membership is 100% "center". The "near left" and the "near right" domains are triangular, and the "far left" and "far right" domains are trapezoidal.

Referring back to FIG. 15, the fuzzy logic inference engine accesses a rule base 1504 and processes the fuzzy logic membership function provided in step 1502. In the preferred embodiment, a complex rule base is not required. Experimentation showed that, for purposes of harvesting, a one-to-one mapping of the domains and their corresponding numeric memberships provided by the fuzzification in block 1502 (FIG. 16) to the defuzzification domains (FIG. 17) is sufficient to keep a combine on course. Thus the rules followed by the inference engine map (1) far left to far left, (2) near left to near left, (3) center to center, (4) near right to near right, and (5) far right to far right.

It should be recognized, however, that, depending upon the spacing of the crop rows, the type of crop being cultivated or harvested, the speed of the vehicle, the steering geometry of the various mechanical actuators and linkages, and the performance of the electro-hydraulic proportional control valve that controls the hydraulic actuators, a different and more complex rule base may be necessary.

Referring now to FIG. 17, with the one-to-one mapping provided by the inference engine using the rule base 1504 the fuzzy vehicle control circuit, one can readily calculate the desired steering angle of the vehicle. In FIG. 17 there are five domains: far left, near left, center, near right and far right. These map one-to-one to the similarly named domains of FIG. 16. The output of the FIG. 17 membership function is the desired steering angle in degrees. The "degrees" represent the angle of the steerable wheels with respect to the longitudinal axis of the vehicle itself. Thus, as the steering output increases from 0 to 40, the wheels go from pointing straight ahead to a right turn angle of 40° with respect to the longitudinal center line of the vehicle. A steering angle of −40°, similarly, corresponds to an angle in which the wheels to be steered are at an angle of 40° to the left of the longitudinal center line of the vehicle. The larger the absolute value of the output, the sharper the turn.

As mentioned above, when the midpoint of the line extracted from the image is disposed 400 pixels across from the left hand side of the image frame, the vehicle is "on course". 400 pixels corresponds to 100% membership in the center domain (FIG. 16). Mapping this in a one-to-one manner to the output membership function in FIG. 17, the steering output would be 0°. In other words, when the midpoint of the line extracted from the image, the row location value, is at 400 pixels the vehicle is perfectly on course and the wheels should be steered straight ahead. Zero degrees means straight ahead, turning neither to the right or to the left.

The prior example, however, is trivial. As another example of this one-to-one mapping, let us assume that the $point_x$ value is 322 pixels. As described above, this would provide a 50% membership in the far left domain and a 50% membership in the near left domain. Taking these memberships and mapping them in a one-to-one manner into the output membership function of FIG. 17, produces the two areas 602 in the far left domain and 604 in the near left domain of the output membership function. These domains are shown as the shaded regions defined between 0.5 (50%) membership value and a 0 membership value in the output membership function of FIG. 17.

Many methods can be used to reduce multiple domain memberships to a single real-valued output. Depending upon the methods used, the shapes of the domains may vary. In the output membership function of FIG. 17 (block 1506 of FIG. 15) the center of area method was chosen for convenience. Other methods, such as center of gravity, for example, would be equally useful but were not chosen. Using the center of area method, and combining the hatched areas 602 and 604, the system would calculate the steering output to be −19°.

To summarize, for a $point_x$ value of 322 pixels from the right side of the image frame, the fuzzy vehicle control of block 1408 generates a desired or command steering angle of −19°. Intuitively, this makes sense. As the line of crops appears to move to the left from its center position of 400 pixels to 322 pixels, this indicates that the vehicle is moving to the right. To respond to this drift to the right, the combine must be steered to the left (i.e., in the negative direction).

While the above illustrates the input membership function, the output membership function and the one-to-one mapping for the specific values of 400 pixels and 322 pixels, it should be clear that any other values of $point_x$ could be calculated in a similar fashion in order to provide the desired or command steering angle.

Pid Steering Controller

Once the desired or command steering angle has been calculated, it must be used to generate the actual signal applied to proportional control valve 40 to control vehicle steering. This steering control is indicated by the circuit shown in FIG. 14 as block 1410, labeled "steering control". The core of the steering control circuit is a PID control loop or "PID controller". The PID controller and the hardware it controls is shown as an automatic control diagram in FIG. 18.

The PID controller circuit, like the other circuits described herein is implemented as a series of programmed instructions executed.

The PID controller, together with the valve actuator and wheels of the system are shown in control diagram form. Input to the steering control circuit is the desired or command steering angle, which is shown on the left hand side of the FIGURE as item 1802. This is the angle that is generated by the output membership function of FIG. 17.

The desired angle and a signal representative of the angular position of the rear wheels (the steerable wheels) are differenced in summer 1804. Out of this comes the angle error on line 1806. Line 1806, in turn carries the angle error to the PID controller shown as block 1808. PID controller 1808 preferably incorporates terms that are proportional, integral and derivative of the angle error. Depending upon the system, there may be only two terms. The particular controller constants will depend on the specific value used, the iteration speed of the control loop, and the sensors used to provide feedback.

Out of this block, comes a valve signal on line 1810. The valve signal is applied to coil 46 of valve 40. The valve regulates the flow from hydraulic supply 44 identified as quantity of flow $Q_{44}$. The reduced flow, q, exits the valve on hydraulic line 1812, which conducts hydraulic fluid flow, q, to the hydraulic actuators that control the steering. These are cylinders 32, 34. As the actuators move, they cause the steering linkage, shown in FIG. 1 and identified as block 1814 in FIG. 18, to move. The steering linkage, in turn, moves wheels 24 and 26.

In the preferred embodiment, the actuator is coupled to a position sensor 1816 that senses the longitudinal position of at least one of the two hydraulic cylinders 32, 34. This signal is indicative of the angular position of the wheels. Since the steering linkage, the wheels and the actuator are coupled together in a predetermined geometric relationship, any change in one of their positions will indicate a corresponding change in the other.

Figure 18:
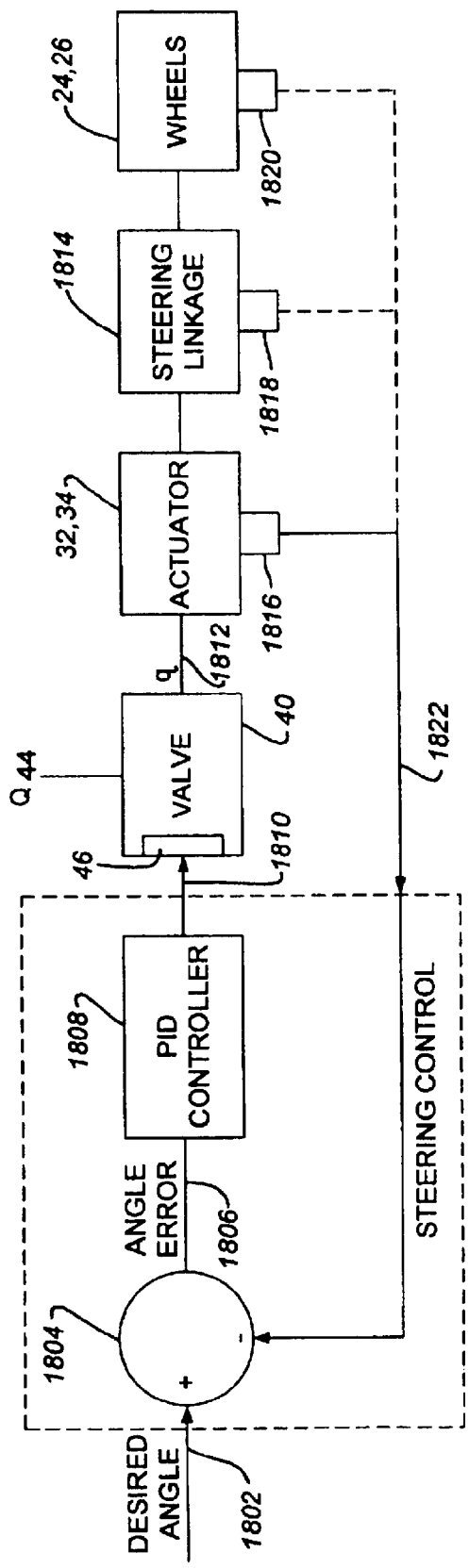
FIG. 18 is a control system flow diagram showing the operation of the steering control and its effect on the electro-hydraulic valve, the hydraulic actuator, the steering linkage and the wheels of the vehicle.

Alternatively, the position sensor need not be coupled to the actuator, but might be coupled to a part of the steering linkage itself shown by sensor 1818 in FIG. 18. This optional relationship is shown by the dashed lines that coupled sensor 1818 to the feedback path 1822 going to summer 1804.

Alternatively, the position sensor could be coupled to the wheels, or the wheel hub, to provide a signal indicative of the actual wheel position. This alternative relationship is shown by the dashed line coupling sensor 1820 to return path 1822 in FIG. 18.

Regardless of the location of the sensor, the steering control circuit does require an input signal that indicates the degree of turning of the steerable wheels.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method of guiding an agricultural vehicle having at least one steerable wheel in an agricultural field having a plurality of rows of crops, the method comprising:

taking a picture of the rows of crops with an electronic camera;

successively processing a plurality of lines of the picture;

extracting from the plurality of processed lines at least one value indicative of a crop line;

extracting another value from the at least one value that is indicative of the lateral displacement of the crop line with respect to the vehicle;

processing the another value in a fuzzy logic input membership function, then a fuzzy logic inference engine and then a fuzzy logic output membership function to develop a signal indicative of the degree the at least one steerable wheel should be turned;

providing the signal indicative of the degree to which the steerable wheel should be turned to a feedback control circuit configured to steer the at least one steerable wheel in a direction that minimizes a difference between the signal indicative of the degree the at least one steerable wheel should be turned and another signal indicative of the degree to which the at least one steerable wheel is actually turned;

generating a valve control signal calculated to reduce the difference;

applying the valve control signal to an electro-hydraulic control valve configured to steer the at least one steerable wheel; and steering the wheel accordingly, wherein the output membership function includes at least three domains symmetric with respect to a steering angle of zero, and farther wherein the at least three domains include a center domain wherein a 100% membership causes the at least one steerable wheel to move toward or to remain in a mode of straight line travel.

2. The method of claim 1, wherein the step of extracting another value includes the step of extracting values sufficient to define a line indicative of a row of crops, a gap between a row of crops, or a cut/uncut boundary in a field.

3. The method of claim 1, wherein the step of processing the another value includes the step of processing the another value in the input membership function to produce at least a first input value indicative of a degree of membership in a first input membership function domain and a second input value indicative of a degree of membership in a second input membership domain.

4. The method of claim 3, wherein the step of processing the another value includes the step of processing the first and second input values in the fuzzy logic inference engine.

5. A method of guiding an agricultural vehicle having at least one steerable wheel in an agricultural field having a plurality of rows of crops, the method comprising:

taking a picture of the rows of crops with an electronic camera;

successively processing a plurality of lines of the picture;

extracting from the plurality of processed lines at least one value indicative of a crop line;

extracting another value from the at least one value that is indicative of the lateral displacement of the crop line with respect to the vehicle;

processing the another value in a fuzzy logic input membership function, then a fuzzy logic inference engine and then a fuzzy logic output membership function to develop a signal indicative of the degree the at least one steerable wheel should be turned;

providing the signal indicative of the degree to which the steerable wheel should be turned to a feedback control circuit configured to steer the at least one steerable wheel in a direction that minimizes a difference between the signal indicative of the degree the at least one steerable wheel should be turned and another signal indicative of the degree to which the at least one steerable wheel is actually turned;

generating a valve control signal calculated to reduce the difference;

applying the valve control signal to an electro-hydraulic control valve configured to steer the at least one steerable wheel; and steering the wheel accordingly, wherein the step of extracting another value includes the step of extracting values sufficient to define a line indicative of a row of crops, a gap between a row of crops, or a cut/uncut boundary in a field, wherein the step of processing the another value includes the step of processing the another value in the input membership function to produce at least a first input value indicative of a degree of membership in a first input membership function domain and a second input value indicative of a degree of membership in a second input membership domain, wherein the step of processing the another value includes the step of processing the first and second input values in the fuzzy logic inference engine, and wherein the output membership function includes at least three domains symmetric with respect to a steering angle of zero, and further wherein the at least three domains include a center domain wherein a 100% membership causes the at least one steerable wheel to move toward or to remain in a mode of straight line travel.

6. The method of claim 5, wherein two of the at least three domains are symmetrically disposed on either side of a center of the center domain.

7. The method of claim 6, wherein the at least three domains include two additional domains that are also symmetrically disposed on either side of the center of the center domain.

8. A method of guiding an agricultural vehicle having at least one steerable wheel in an agricultural field having a plurality of crop rows, the method comprising:

taking a picture of the crop rows with an electronic camera;

extracting from the pictures row location values indicative of a location of at least one crop row;

determining, based upon at least one previous row location value, whether the row location values are valid;

and for each such row location values that are determined valid:
- deriving therefrom a value indicative of a desired direction of travel;
- processing the value indicative of a desired direction of travel in a fuzzy logic inference engine to produce a control signal;
- providing the control signal to an automatic control loop that uses feedback control based upon the position of the at least one steerable wheel to generate a valve command signal;
- applying the valve command signal to an electro-hydraulic steering control valve;

and for each such row location values that is determined invalid:
- not using such invalid row location value in the automatic control loop.

9. The method of claim 8, wherein the step of deriving therefrom a value includes the step of processing the row location value in a first fuzzy logic control circuit.

10. The method of claim 9, wherein the value indicative of a desired direction of travel is a value indicative of a desired steering angle.

11. The method of claim 9, wherein the value indicative of a desired direction of travel is a value indicative of a desired steering rate.

12. The method of claim 10, wherein the step of determining whether the row location values are valid includes the step of processing the row location values in a second fuzzy logic control circuit.

13. The method of claim 12, wherein the row location values include values sufficient to define a line having a slope and an intercept in the image frame from which the row location values were extracted.

14. The method of claim 13, wherein the row location values are indicative of a crop row.

15. The method of claim 13, wherein the row location values are indicative of a gap between crop rows.

16. The method of claim 13, wherein the row location values are indicative of a cut/uncut boundary in the field.

17. The method of claim 9, wherein the first fuzzy logic control circuit includes at least one fuzzy logic input membership function to process at least one of the row location values and a second fuzzy logic input membership function to process at least another of the row location values, and further wherein both the at least one and at least another row location values are extracted from a single camera image.

* * * * *